June 21, 1932.  R. BERTHON  1,863,739
APPARATUS FOR PHOTOGRAPHY AND CINEMATOGRAPHY IN NATURAL COLORS
Filed June 26, 1928  2 Sheets-Sheet 1
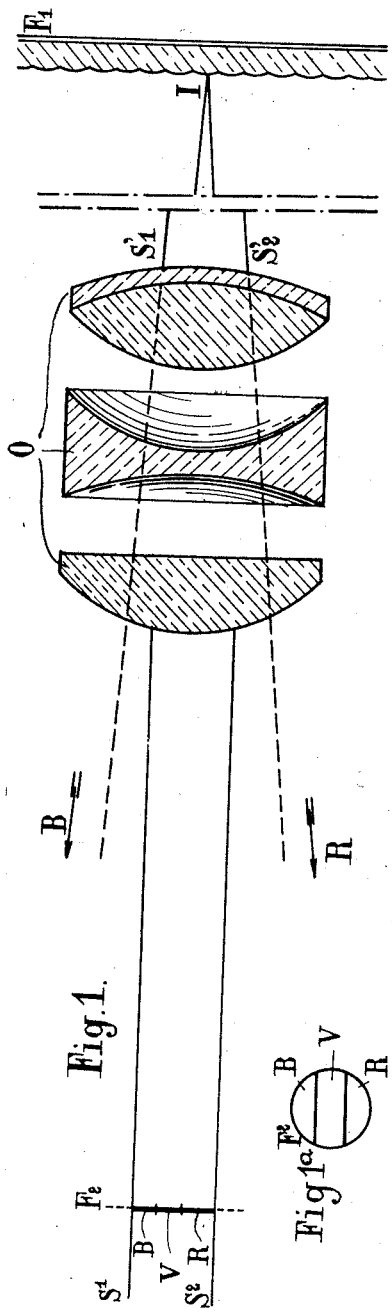
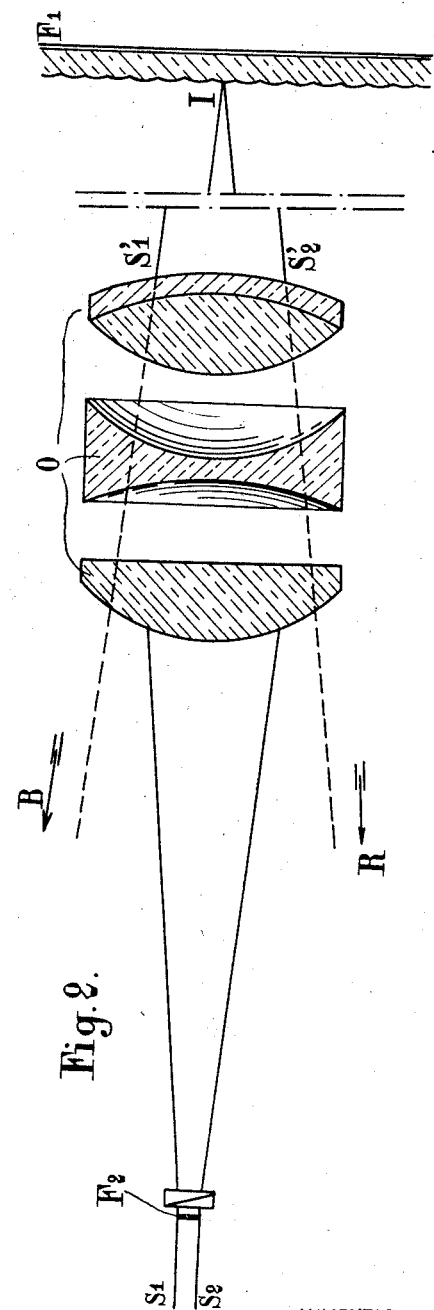
INVENTOR:
Rodolphe Berthon
BY
ATTORNEY

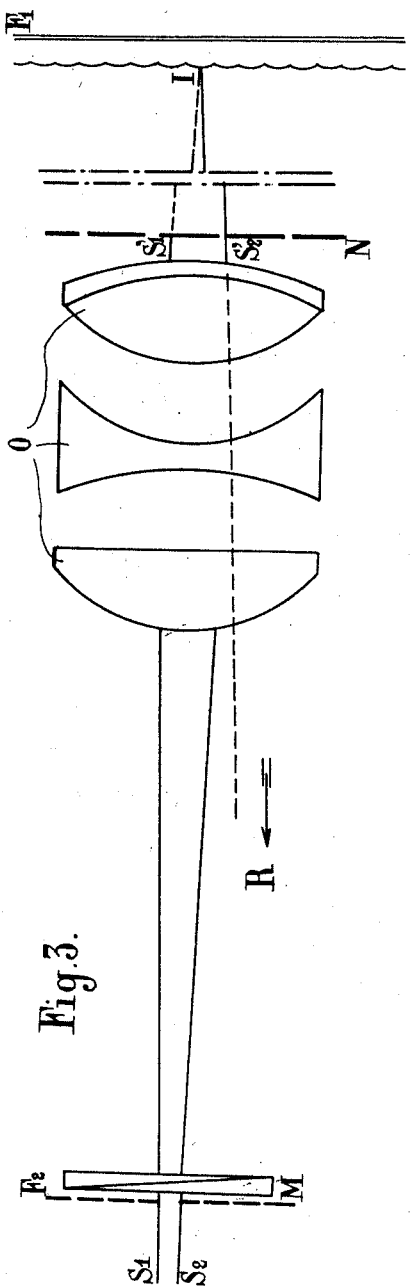

Patented June 21, 1932

1,863,739

UNITED STATES PATENT OFFICE

RODOLPHE BERTHON, OF NEUILLY, FRANCE, ASSIGNOR, BY MESNE ASSIGNMENTS, TO KISLYN CORPORATION, OF NEW YORK, N. Y., A CORPORATION OF DELAWARE

APPARATUS FOR PHOTOGRAPHY AND CINEMATOGRAPHY IN NATURAL COLORS

Application filed June 26, 1928, Serial No. 288,497, and in France June 30, 1927.

The object of this invention is to provide an improved apparatus for photography and cinematography in natural colors according to the now well-known Berthon system, based on the use of the following elements:

1. A film coated with panchromatic emulsion, the backing of which is covered with juxtaposed microscopic refracting elements each having a principal focus equal to the thickness of the backing;

2. A large aperture objective, having preferably an aperture equal to or greater than $f/2.5$, said objective being devoid of any color-selecting device;

3. A color-selecting device arranged in the plane of the front focus of the objective, said device being constituted either by juxtaposed colored screens or by a slot provided with a dispersing or diffracting optical system, and serving in all cases as a diaphragm for the light beams.

The necessity for using an objective of very large aperture arises from the fact that since the color-selecting device serves as a diaphragm situated far in front of the objective, importance attaches to the diameter of the lenses of said objective being sufficient to embrace the entirety of the light cone from the photographed field. Moreover, the large aperture has the effect of permitting the selected colored rays to strike the film under incidences different enough to prevent the impressions made thereby on the emulsion from being blurred.

The chief advantages obtained by the invention are as follows:

First of all, the fact of arranging the color-selecting system far in front of the objective has the effect of causing the selector system to work with parallel beams and, furthermore, of allowing the objective to operate with maximum clearness without introducing more or less reflecting surfaces between the lenses; then, also, it has the effect of causing the objective to operate by autocollimation, so that all the rays emanating from the various points of the selector system emerge from the objective respectively parallel to one another, whereby the use is permitted, in the case of dispersion selectors, of very narrow angled prisms, as will be hereinafter set forth; lastly, illumination of the image is absolutely homogeneous since every point of said image "sees" the entire selector system and "sees" it under one and the same angle.

The characteristic features of the invention consist therefore, at the outset, in the facts that, on the one hand, the selector system works with parallel beams coming from the objective and, on the other hand, that, consequent upon their autocollimation by the objective, rays of one and the same color are themselves parallel to one another on issuing therefrom.

Figures 1, 2 and 3 of the accompanying drawings represent the principal cases to be considered in order to understand the broad lines of the invention, though these figures are merely diagrammatic, being intended only to indicate the paths of the rays.

Fig. 1 shows the case where the selector system is constituted by colored screens (pieces of glass of solid color, colored gelatines or varnishes, or, even, trays containing colored solutions); Fig. 1ª being a face view of the screen.

Fig. 2 illustrates the case where the selector system is constituted by a prism of the so-called "Amici" type, but the dispersion of which is supposed to be very considerable, although designed to avoid the introduction of aberration into the image space. This figure is especially intended to make more readily understood the operation of the device shown in Fig. 3 where the optical system produces dispersion to a very moderate extent only.

In each figure, the film is shown much enlarged, and the microscopic refracting elements are supposed to be constituted by cylindrical surfaces perpendicular to the plane of the figure. Light travels from left to right and the main beams are limited by parallels S1 and S2.

In Fig. 1, the objective is indicated at O, its rear focal plane at F1 and its front focal plane at F2. At F1 is placed the panchromatic film, the microscopic refracting elements of which face toward objective O; and at F2 is located the selector device comprising colored screens B. V. R. (blue, green, red) arranged as parallel bands perpendicular to the plane of the figure and limited by a circular opaque plate wherein they are mounted.

Beams S1—S2, coming from infinity, converge at 1 after having passed through the objective, and lines IS'1 and IS'2 denote the directions in which the screens B and R are viewed from the plane of the film. Consequently, these differently-colored beams strike the film under equally different incidences, and the image of each of the screens becomes printed on the sensitized layer at points equally different. It will, consequently, be realized that, once exposed, developed and inverted, the film will reproduce the natural colors when placed in a camera similar to the one used for picture-taking and when projected by means of a beam of white light. The rays, travelling along a path which is the reverse of the one travelled by the rays that served for picture-taking, will pass through the selector system at the same points as at first and will undergo an analogous selection previous to reaching the projection screen.

In Fig. 2, the objective is also indicated at O and its focal planes also are at F1 and F2; and at F2 is arranged a linear diaphragm the slot of which is supposed to be perpendicular to the plane of the figure. Immediately behind this slot there is a dispersion device so constructed as not to deflect the medium radiations of the spectrum and which may be composed of stepped prisms or of glass prisms submerged in a liquid offering suitable dispersion, etc. It will be supposed that said device gives considerable dispersion and that beam S1—S2 ultimately issues from the objective along lines S'11 and S'21. From point 1, as in the case shown by Fig. 1, the blue radiations will be viewed along direction 1B and the red radiations along direction 1R. The selection of colors and their imprinting under different incidences will therefore take place as in the case shown by Fig. 1, but with this difference that selection will not be due to the employment of colored screens. It should be noted that the device represented in Fig. 2 will, if employed as described, introduce into the general system considerable image aberrations and, consequently, is unserviceable for obtaining sharp images; its sole advantage is to show how selection can be obtained without using colored screens.

Fig. 3 likewise shows objective O and the focal planes F1 and F2 thereof, but the linear diaphragm located according to the front focal plane F2 is replaced by a series of linear slots or a linear weft. Immediately behind said weft there is provided a dispersing device of small dispersion power which will not introduce any substantial aberrations into the formation of images at focus F1. Each of said slots will, by autocollimation, give behind the objective parallel beams. If there is arranged immediately behind the objective a second weft N the slots of which do not register as to number and as to spacing with those of the weft M arranged in plane F2, the result will be that on looking from a point 1 of the film towards the source of light, it will be possible to see, according to a given inclination, for instance IS'2, only a single color (red in the example shown); the other colors will be obtained under different incidences through the other slots of weft M. In order to make a suitable selection of the line-markings of wefts M and N, it is possible to sight from point I a continuous spectrum by sweeping from edge to edge the rear lens of objective O. There is, however, no necessity to employ wefts having different line-markings; an analogous result can be obtained by slightly turning weft N in its plane with relation to weft M, so that their respective slots are no longer strictly parallel. In this case, the successive colors of the spectrum are visible from one end to the other of each of the slots of weft N. Whatever the arrangement contemplated, employment of two wefts located in two different planes and separated by a suitable dispersion device permits of separating according to very different incidences radiations which are very slightly separated by dispersion alone. The same device will restore on projection the natural colors through mere reversibility of the travel of the rays.

Obviously, if, instead of the inverted original film, a positive obtained from the original or from a negative provided with microscopic refracting elements is put in the projecting camera, the result will be the same.

I claim as my invention:

1. Apparatus for photography and cinematography in colors in connection with films goffered with microscopic refracting elements, comprising an objective of wide aperture, a color-selecting device arranged in the front focal plane of the objective, and opaque means limiting the exposure at said device to a single series of color components whose sum is substantially equivalent to white light.

2. Apparatus for photography and cinematography in colors in connection with films goffered with microscopic refracting elements, comprising an objective of wide aperture, a color-selecting screen arranged in the front focal plane of the objective, and opaque means limiting the exposure at said screen to a single series of color components whose sum is substantially equivalent to white light.

In testimony whereof I affix my signature.

RODOLPHE BERTHON.